United States Patent [19]

Cattin

[11] Patent Number: 5,032,153
[45] Date of Patent: Jul. 16, 1991

[54] PROCESS FOR FILTERING AIR AND CYCLONE FILTER WITH FILTER CARTRIDGE FOR IMPLEMENTING THE PROCESS

[75] Inventor: Gabriel Cattin, Pont De Roide, France

[73] Assignee: Cattinair, Pont De Roide, France

[21] Appl. No.: 353,603

[22] Filed: May 18, 1989

[30] Foreign Application Priority Data

May 18, 1988 [FR] France ............................. 88 06830

[51] Int. Cl.⁵ .............................................. B01D 46/94
[52] U.S. Cl. ............................................ 55/96; 55/282;
55/341.1; 55/462
[58] Field of Search ................... 55/294, 96, 302, 303,
55/304, 282, 341.1, 341.6, 462

[56] References Cited

U.S. PATENT DOCUMENTS

| | | | |
|---|---|---|---|
| 2,391,534 | 12/1945 | Yerrick et al. | 55/341.6 |
| 3,097,938 | 7/1963 | Weller | 55/302 |
| 3,256,679 | 6/1966 | Snyder | 55/302 |
| 3,648,442 | 3/1972 | Bourne | 55/294 |
| 3,695,007 | 10/1972 | Farnworth | 55/302 |
| 3,726,066 | 4/1973 | Colley et al. | 55/341.6 |
| 3,951,627 | 4/1976 | Barr, Jr. et al. | 55/341.1 |
| 4,278,454 | 7/1981 | Nemesi | 55/341.1 |
| 4,521,231 | 6/1985 | Shilling | 55/302 |
| 4,681,609 | 7/1987 | Howeth | 55/302 |
| 4,740,221 | 4/1988 | Howeth | 55/302 |

FOREIGN PATENT DOCUMENTS

| | | |
|---|---|---|
| 359468 | 11/1980 | Austria . |
| 2514669 | 4/1983 | France . |
| 8303556 | 10/1983 | PCT Int'l Appl. . |

Primary Examiner—Jay H. Woo
Assistant Examiner—C. Scott Bushey
Attorney, Agent, or Firm—Sandler, Greenblum & Bernstein

[57] ABSTRACT

Process and apparatus for filtering air in a cyclone filter by reducing the ascending speed of air to be filtered in the lower part of the filter by providing a skirt on the filter cartridge. Perforations are included in the skirt, which make it possible to increase the intake surface for the air at the lower intake of the skirt. Moreover, the diameter and density of the perforations are adapted according to the type of dusts and wastes suspended in the air.

8 Claims, 2 Drawing Sheets

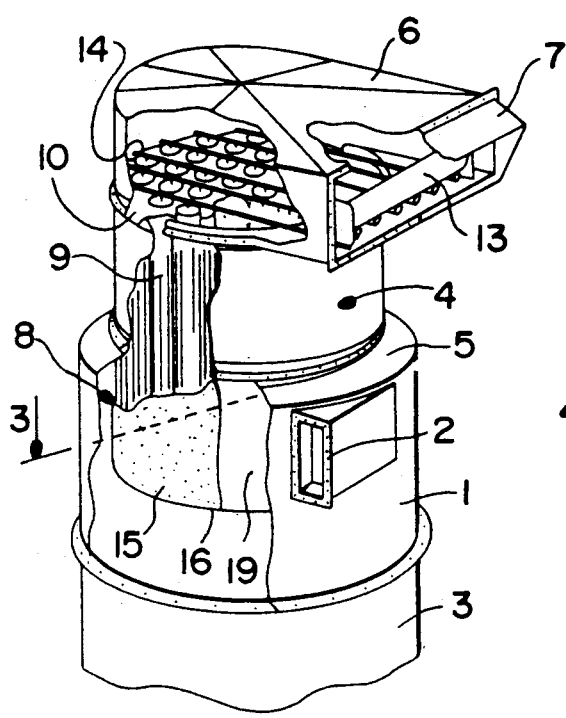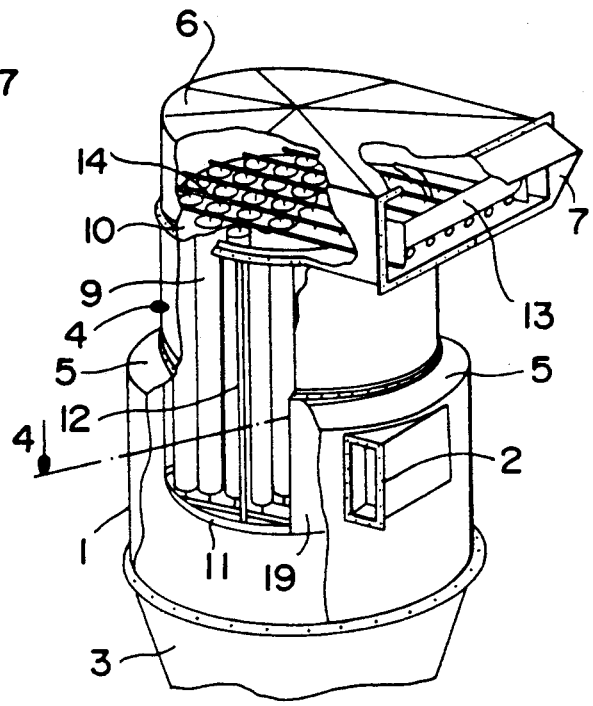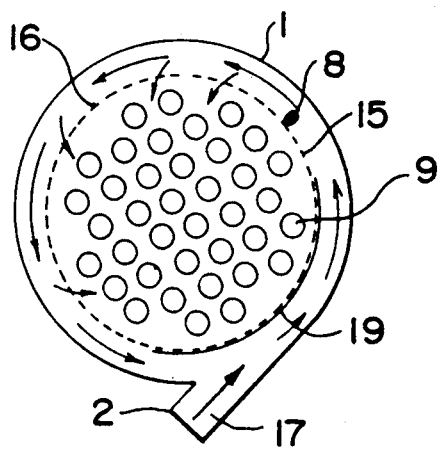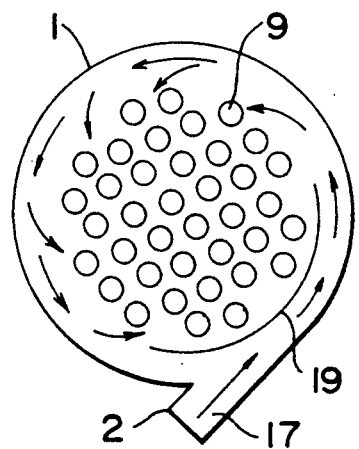

PROCESS FOR FILTERING AIR AND CYCLONE FILTER WITH FILTER CARTRIDGE FOR IMPLEMENTING THE PROCESS

BACKGROUND OF THE INVENTION

The present invention relates to a process for filtering air in an apparatus referred to as a cyclone filter. It also relates to the apparatus, that is to say the cyclone filter and the filter cartridge which permit implementation of the process.

An example of this type of apparatus is described in the document FR-A-2,514,669 of the present inventor. These apparatus are particularly intended for extracting elements suspended in drawn air in premises for the production, treatment or storage of pulverulent products, or of certain industries generating the emission of wastes such as, for example, highly volatile splinters or sawdusts.

These apparatus consist of three principal elements, which are generally centered on one and the same vertical axis:

a cylindrical or conical upper body, in which the air to be de-dusted enters tangentially, a settling chamber arranged underneath the upper body, this chamber being either in the form of a funnel or of cylindrical shape; it is equipped with means for picking up waste products in its lower part, a filter cartridge consisting of filtering sleeves stretched vertically between the settling chamber and the cover of the apparatus where the filtered air is evacuated.

The air is purified in two stages. In the first stage, the heaviest dusts are separated by cyclonic centrifugation and fall directly into the settling chamber; and in the second stage, the residual dusts suspended in the air, which represent approximately 20% of the total, are retained in the filter cartridge and, in particular, on the vertical sleeves. These sleeves are generally made from a material of the needled-felt type. The quality of the filtering depends not only on the material used for the filter, but also on its condition and the speed of passage of the air. During its use, the filter progressively fills up, the pores become blocked, thereby creating a braking effect which is reflected at the air suction fan by a drop in flow rate. These apparatus are generally equipped, as described in the above-mentioned document, with an automatic unclogging device which makes it possible to regenerate filters. This unclogging takes place from the suction cover by means of jets of compressed air or the like which circulate countercurrentwise and which, for each filtering sleeve, repel the dusts which accumulate on the surface to the outside of the sleeves. The frequency of the unclogging operation is usually regulated by means of a cyclic programmer. The particles detached from the sleeves usually fall into the lower hopper.

Other apparatuses of this type are described, for example, in the document US-A-3,648,442. The filtering sleeves extend vertically in the body of the cyclone filter and are surrounded over a part of their height by a skirt whose function is to cover the inlet of charged air. These filtering sleeves are not, properly speaking, part of a specific cartridge associated with the body of the cyclone filter.

In such an apparatus, the lower part of the sleeves 'silts up' fairly rapidly.

In the abovementioned document FR-A-2,514,669, the filter cartridge comprises a cylindrical casing which extends vertically over the entire height of the filtering sleeves, and this cartridge is open at both its ends. The lower end of the cartridge is located above the settling chamber, and is open to the outside of the sleeves. The upper end is being located in the cover of the apparatus, and is open to the inside of the sleeves. The charged air penetrates into the lower part of the filter cartridge, rises by means of suction into this cartridge around the sleeves, and, after having passed through the sleeves, is evacuated at the upper part of the cartridge referred to as the cover.

During unclogging, the particles detached from the surface of the sleeves usually fall by means of gravity; they drop more or less quickly as a function of the ascending speed of the air to be de-dusted which rises between the filtering sleeves. They are therefore stopped by the upward motion of the air in the cartridge between the sleeves. As the unclogging takes place sleeve by sleeve or by group of sleeves, the particles which are ejected from a sleeve and which are disturbed by the ascending speed of the air between the sleeves attach themselves to the adjacent sucking sleeve.

This same phenomenon is also found in the apparatus described in the above-mentioned document US-A-3,648,442. In this apparatus, the sleeves are encased only over a part of their height, and their lower part rapidly 'silts up'. The ascending speed of the air in the lower part of the barrel very quickly becomes too great to allow the dusts detached from the surface of the sleeves during the unclogging operation to fall.

In fact, as the ascending speed of the air at the intake of the filter cartridge increases, the number of detached particles that can fall between the sleeves is reduced. Accordingly, the latter area clogs up still further because of the presence of detached particles which results in the air being forced to rise higher between the sleeves before passing through their wall, and therefore the inlet speed of the air in the cartridge is maintained over a greater height.

SUMMARY OF THE INVENTION

The present invention aims at remedying these drawbacks in order to improve the unclogging performance of the filtering sleeves by achieving, in particular, better evacuation of the detached particles downwards, that is to say towards the settling chamber.

The invention consists in reducing the speed of the air in the lower part of the filter cartridge by substantially increasing the inlet surface for the air in the said cartridge, thereby limiting the average speed of the air in the lower part of the filter cartridge in order to bring it at a lower speed to the falling speed of the particles at the time of and after unclogging.

According to another preferential arrangement of the invention, which permits optimum use of the filtering sleeves and, in particular of sleeves of the felt type, the process consists in reducing the loss of charge in the filters by more than 50%.

The invention also relates to the filter cartridge enabling the process and the apparatus to be implemented, which latter is of the cyclone filter type equipped with a device for unclogging the filtering sleeves.

The cyclone filter according to the invention is equipped with a cartridge which comprises, in its lower part, means for reducing the ascending speed of the air to be de-dusted, which means are arranged in the upstream part of the filtering sleeves and, for the passage of the air to be de-dusted, offer a surface which is greater than the surface of the section available between the sleeves in the upper part of the cartridge.

According to a preferred arrangement of the invention, these means consist in a multitude of perforations made in the skirt, in its part located inside the body of the cyclone filter.

According to an alternative embodiment, the cylinder-shaped skirt comprises an unperforated part arranged in front of the inlet for the air to be dedusted and a perforated part over the rest of its periphery.

In both cases, the perforated skirt permits an intake of air over the periphery of the cartridge in its part located inside the body; this peripheral air intake reduces the speed of the air at the lower intake of the skirt. Moreover, such a perforated skirt constitutes an impact filter which improves the separation of the particles suspended in the air without adversely affecting the cyclonic character of the apparatus.

According to another embodiment of the invention, the casing of the sleeves surrounds only the upper part of the cartridge. In this embodiment the skirt only partially covers the lower part of the filters and has the form of an unperforated sheet forming a screen, arranged in front of the inlet for the air to be filtered.

According to a final embodiment of the invention, the skirt has a frustoconical shape, which is flared at the upstream part of the filtering sleeves; the upper body optionally having a frustoconical shape to match the shape of the skirt.

BRIEF DESCRIPTION OF THE DRAWINGS

The invention will be further illustrated with the aid of the following description and the appended drawings which are given by way of indication and in which:

FIG. 1 illustrates a first embodiment of the invention,
FIG. 2 illustrates a second embodiment of the invention,
FIG. 3 is a section along 3 of FIG. 1,
FIG. 4 is a section along 4 of FIG. 2.

DETAILED DESCRIPTION OF THE INVENTION

Figure 5:
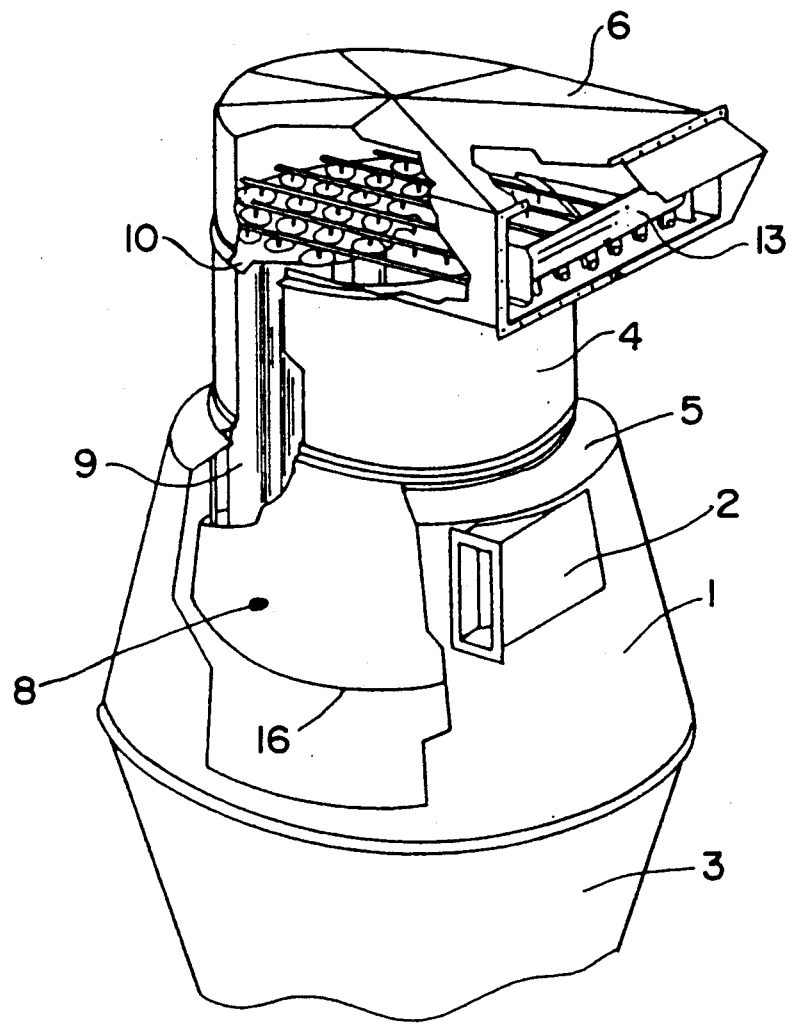
FIG. 5 illustrates a third embodiment.

The apparatus represented in FIGS. 1 and 2 is an apparatus of the cyclone filter type with automatic unclogging.

The apparatus comprises:
an upper body 1 in the form of a cylindrical or frustoconical barrel, comprising a tangential inlet 2 for the air to be de-dusted;
a settling chamber 3 whose shape in FIG. 1 is cylindrical and, in FIG. 2, conical. These settling chambers are arranged in the extension of and underneath the upper body 1; and they comprise in their lower part means, which are not shown, for picking up particles and dusts deposited there;
a filter cartridge 4 fixed to the upper body 1 by means of an annular collar 5.

These various elements which constitute the apparatus are circular in shape and are centered on a vertical axis and the filter cartridge 4 extends substantially, half and half, into the upper body 1 and above this body 1, fixed by means of the collar 5. The upper part of the filter cartridge consists of a cover 6 equipped with a nozzle 7 for evacuating the filtered air; it encloses the automatic unclogging device which will be discussed hereinbelow.

The filter cartridge 4 generally consists of a cylindrical casing or wall 8. Inside this casing 8 are filtering sleeves 9 which are arranged vertically and stretched between a perforated plate 10, arranged in the upper part of the casing 8 at the cover 6 and, for example, a grill 11 located above the settling chamber and held by vertical rods 12 connected to the perforated plate 10. In other devices, the filtering sleeves may be suspended vertically and held by metal-wire cages.

In the cover 6, above the perforated plate 10 is an automatic unclogging system 13 consisting, for example, of several fixed ramps 14 which inject compressed air into the vertical sleeves 9 so as to cause detachment of the particles of dust which have collected on the outer surface of the sleeves 9.

FIG. 1 shows means which make it possible to reduce the ascending speed of the air at the intake of the filter cartridge 4. These means consist of perforations 15 made in the lower part of the casing 8 of the cartridge 4 located in the body 1. This lower part of the casing 8 is in the form of a skirt 16.

The holes or perforations 15 are uniformly distributed over the skirt 16 of the casing 8. Their diameter depends on the type of dusts encountered. These holes 15 also constitute an additional filtering stage and, in particular, an impact filtration.

In the illustrative embodiment of FIG. 2, the skirt 16 is open, revealing the lower part of the sleeves 9 located in the upper body 1. However, it is noted that in FIGS. 1 and 2, as well as in FIGS. 3 and 4, there is a screen 19 inserted between the intake 17 of the upper body 1 and the inner part of the filter cartridge comprising the vertical sleeves 9. This screen 19 extends over a sector of a circle from the intake for the air to be de-dusted up to a quarter or a third approximately of the circumference of the cartridge 4. The aim of this screen 19 is to protect the lower part of the sleeves arranged in the area of the inlet for the air to be de-dusted against damage of any sort due to the particles suspended in the air.

This screen 19 may consist of the skirt 16 of the casing 8 partially perforated over a cylindrical sector forming ⅔ or ¾ of the total perimeter of the casing. In FIG. 2, the skirt 16 comprises an opening which completely uncovers the lower part of the sleeves 9; this peripheral opening extends over ⅔ or ¾ of the perimeter of the said casing 8.

The screen 19 will be of a size which may be varied according to the nature of the dusts to be filtered.

In the case where a perforated skirt is used, and still according to the nature of the dusts, this screen can be totally dispensed with.

FIG. 3 shows, in the form of a horizontal section, the filter cartridge 4 whose skirt 16 is perforated with a plurality of holes 15; a screen 19 masks part of the holes 15 of the skirt 16 at the intake for the air to be de-dusted. This screen 19 in the form of a cylindrical sector is fixed to the annular collar 5; it extends over the entire height of the lower part of the skirt 16 inside the upper body 1. This makes it possible, in particular, to overcome the problem of positioning the cartridge with respect to the inlet for the air to be dedusted.

FIG. 4 shows another embodiment showing the screen 19 still in the form of a cylindrical sector and inserted directly between the intake for the air to be de-dusted and the sleeves 9 arranged directly opposite this intake 17. In this illustrative embodiment, the skirt 16 corresponds to this screen 19; the lower part of the sleeves 9 is directly located in the cylindrical body 1.

Because of the presence of the perforations 15 or of the opening of the skirt 16 to the lower part of the cartridge, the dusty air arrives radially over the lower part of the sleeves over a variable height, corresponding substantially to ⅓ or half of the height of the said sleeves 9. The lower part 16 of the cartridge, that is to say the upstream part of the filtering sleeves 9, comprises, for the intake of the air, an opening whose surface is greater than the section for the passage of the air in the upper part of the said cartridge, that is to say in the downstream part of the sleeves 9. This surface is larger or smaller according to the type of dusts and wastes to be removed.

A considerable reduction in the ascending speed of the air in the filter cartridge is thereby obtained, this reduction being of the order of a half. By way of example, in the case of current apparatus, with a casing whose skirt is perforated it is possible to obtain ascending speeds of the order of 1.7 m/second. In the case of an unperforated casing, that is to say with an intake of air only in the lower part of the cartridge, the speeds are of the order of 3.5 to 4 m/second.

Better efficiency of filters and, above all, the possibility of operating with a loss of charge which is reduced by more than 50% for a flow rate of the order of 250 m$^3$/hour and per m$^2$ of filtering surface is thereby obtained. By way of example, for a current apparatus, the loss of charge may reach 200 mm of a column of water for a flow rate of 180 m$^3$/hour and per m$^2$ of filtering surface.

Still by way of example, for air charged with wood wastes and dusts from carpentry, with a concentration the order of 50 g per m$^3$ of air, the skirt comprises holes 15 having a diameter of the order of 10 mm and these holes are arranged so as to occupy approximately 50% of the total surface of the skirt 16.

A third embodiment is shown in FIG. 5. The apparatus comprises an upper body 1 in the form of a frustoconical barrel equipped at its upper part with a tangential inlet 2 for the air to be filtered. The upper body 1 is mounted on top of a settling chamber 3 of conical shape, such as is represented also in FIG. 2. The filter cartridge 4 is fastened to the upper body 1 by means of an annular collar 5 as in the two preceding embodiments shown in FIGS. 1 and 2.

The casing 8 of the filter cartridge 4 extends into the upper body 1 in the shape of a frustoconical skirt which extends up to the lower part of the filtering sleeves 9. This frustoconical skirt has in its upper part, that is to say substantially mid-way up the filtering sleeves 9, a diameter which is equivalent to that of the casing 8 of the filter cartridge and, in its lower part, at the intake for the air to be filtered, a larger diameter of the order of 10% more than the upper diameter, which makes it possible to increase the intake surface in the lower part of the filter cartridge and, consequently, to reduce the ascending speed of the air in this part of the filter cartridge.

As stated above, the performance and behavior of the filters as well as the overall performance of the installation are considerably improved, due to lower energy consumption.

The reference signs inserted after the technical characteristics mentioned in the claims are intended only to facilitate comprehension of the latter and do not limit their scope in any way.

I claim:

1. A process for filtering air comprising flowing air to be filtered through a cyclone filter, which cyclone filter comprises,
   a filter cartridge having an upper portion and a lower portion, with said lower portion including a skirt;
   an upper body having a vertical axis, said upper body including a tangential inlet for air to be filtered, and inside of which upper body is located said lower portion of said filter cartridge;
   means for automatically unclogging said filter cartridge;
   a cover including means for evacuating filtered air, with said cover closing said means for automatically unclogging said cartridge; and
   a settling chamber arranged below said upper body and below said filter cartridge;
   said filter cartridge being equipped with filter sleeves stretched vertically between said settling chamber and said cover where the filtered air is evacuated, and including means for reducing the ascending speed of air to be filtered, with said means for reducing the ascending speed being arranged at said lower portion of said filter cartridge at an upstream part of said filtering sleeves.

2. The process for filtering air according to claim 1, wherein said skirt is dimensioned and positioned whereby a loss in charge of filters in the filter cartridge is reduced by more than 50%.

3. A cyclone filter comprising:
   a filter cartridge having an upper portion and a lower portion, with said lower portion including a skirt;
   an upper body having a vertical axis, said upper body including a tangential inlet for air to be filtered, and inside of which upper body is located said lower portion of said filter cartridge;
   means for automatically unclogging said filter cartridge;
   a cover including means for evacuating filtered air, with said cover closing said means for automatically unclogging said filter cartridge; and
   a settling chamber arranged below said upper body and below said filter cartridge;
   said filter cartridge being equipped with filter sleeves stretched vertically between said settling chamber and said cover where the filtered air is evacuated, and including means for reducing the ascending speed of air to be filtered, with said means for reducing the ascending speed being arranged at said lower portion of said filter cartridge at an upstream part of said filtering sleeves.

4. The cyclone filter according to claim 3, wherein said means for reducing the ascending speed of air comprises at least one opening made in said skirt at the upstream part of said filtering sleeves.

5. The cyclone filter according to claim 3, wherein said means for reducing the ascending speed of air comprises a skirt having a cylindrical shape, and including a multitude of perforations.

6. The cyclone filter according to claim 3, further including means for protecting lower portions of said filtering sleeves, which means for protecting comprise a sheet forming a screen in front of said tangential inlet for air to be filtered.

7. The cyclone filter according to claim 3, wherein said skirt comprises a portion forming a screen in front of said tangential inlet for air to be filtered, and the remainder of said skirt being substantially covered with perforations.

8. The cyclone filter according to claim 3, which comprises, in said upper body, a skirt of frustoconical shape which is flared above said settling chamber.

* * * * *